United States Patent [19]
Yuen

[11] Patent Number: 5,600,711
[45] Date of Patent: Feb. 4, 1997

[54] APPARATUS AND METHODS FOR PROVIDING INITIALIZING SETTINGS TO AN APPLIANCE

[76] Inventor: Henry C. Yuen, P.O. Box 1159, Redondo Beach, Calif. 90278

[21] Appl. No.: 237,506

[22] Filed: May 3, 1994

[51] Int. Cl.⁶ .............................. H04M 11/00; H04N 5/44
[52] U.S. Cl. ..................... 379/102; 379/104; 379/105; 348/734
[58] Field of Search ..................... 379/102, 104, 379/105; 348/734; 455/151, 353

[56] References Cited

U.S. PATENT DOCUMENTS

| | | | |
|---|---|---|---|
| 2,188,145 | 1/1940 | Frantz | 58/24 |
| 2,671,131 | 3/1954 | Johnson | 178/6 |
| 3,881,310 | 5/1975 | Gerum et al. | 58/35 |
| 4,023,344 | 5/1977 | Mukaiyama | 58/35 |
| 4,087,958 | 5/1978 | Ebihara et al. | 58/25 |
| 4,501,502 | 2/1985 | Van Orsdel | 368/47 |
| 4,620,229 | 10/1986 | Amano et al. | 358/194.1 |
| 4,623,887 | 11/1986 | Welles, II | 340/825.57 |
| 4,718,112 | 1/1988 | Shinoda | 455/151 |
| 4,825,200 | 4/1989 | Evans et al. | 341/23 |
| 4,843,384 | 6/1989 | Ide et al. | 348/734 |
| 4,866,542 | 9/1989 | Shimada et al. | 360/10.3 |
| 4,899,370 | 2/1990 | Kameo et al. | 379/102 |
| 4,965,557 | 10/1990 | Schepers et al. | 340/711 |
| 5,056,070 | 10/1991 | Shibuya et al. | 368/10 |
| 5,063,543 | 11/1991 | Shibuya et al. | 368/29 |
| 5,089,814 | 2/1992 | DeLuca et al. | 340/825.49 |
| 5,166,911 | 11/1992 | Misawa et al. | 368/10 |
| 5,226,090 | 7/1993 | Kimura | 381/110 |
| 5,228,077 | 7/1993 | Darbee | 379/102 |
| 5,251,191 | 10/1993 | Sturzl et al. | 368/47 |
| 5,255,313 | 10/1993 | Darbee | 379/10 |
| 5,258,964 | 11/1993 | Koma et al. | 368/47 |
| 5,265,070 | 11/1993 | Minowa | 368/47 |
| 5,319,374 | 6/1994 | Desai et al. | 342/387 |
| 5,414,756 | 5/1995 | Levine | 379/67 |

FOREIGN PATENT DOCUMENTS

| | | |
|---|---|---|
| 6121376 | of 0000 | Japan . |
| 1126098 | of 0000 | Japan . |
| 1-126098 | 5/1989 | Japan . |
| 6-121376 | 4/1994 | Japan . |

*Primary Examiner*—Jason Chan
*Attorney, Agent, or Firm*—Christie, Parker & Hale, LLP

[57] ABSTRACT

Apparatus and methods are provided for setting a clock in an appliance. The method includes the steps of initiating a telephone connection with a remote site, downloading over the telephone connection a first sequence of commands for setting the clock in the appliance, and storing the first sequence of commands in a memory in the remote controller. The method further includes the steps of entering a single command into the remote controller to set the clock in the appliance to be equal to a second clock in the remote controller, processing the single command in the remote controller to insert a time read from the second clock in the remote controller into the first sequence of commands for setting the clock in the appliance to form a sequence of time commands, and transmitting the sequence of time commands from the remote controller to set the first clock in the appliance. Another method is provided for initializing settings in an appliance. The method includes the steps of initiating a telephone connection with a remote site, downloading over the telephone connection a first sequence of commands for initializing settings in the appliance, and storing the first sequence of commands in a memory in the remote controller. The method further comprises the steps of entering a single command into the remote controller to initialize settings in the appliance, processing the single command in the remote controller to transmit the first sequence of commands from the remote controller to initialize settings in the appliance.

8 Claims, 16 Drawing Sheets

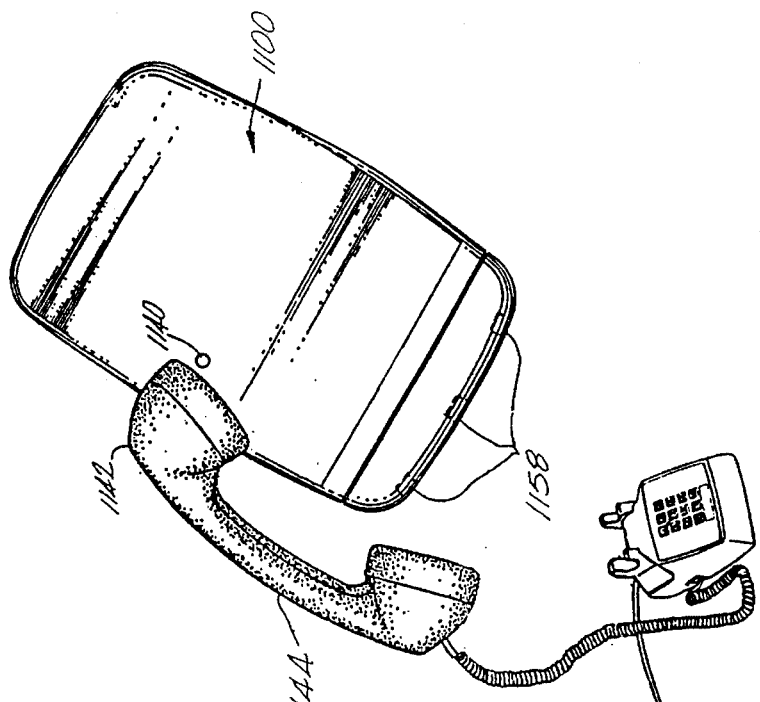
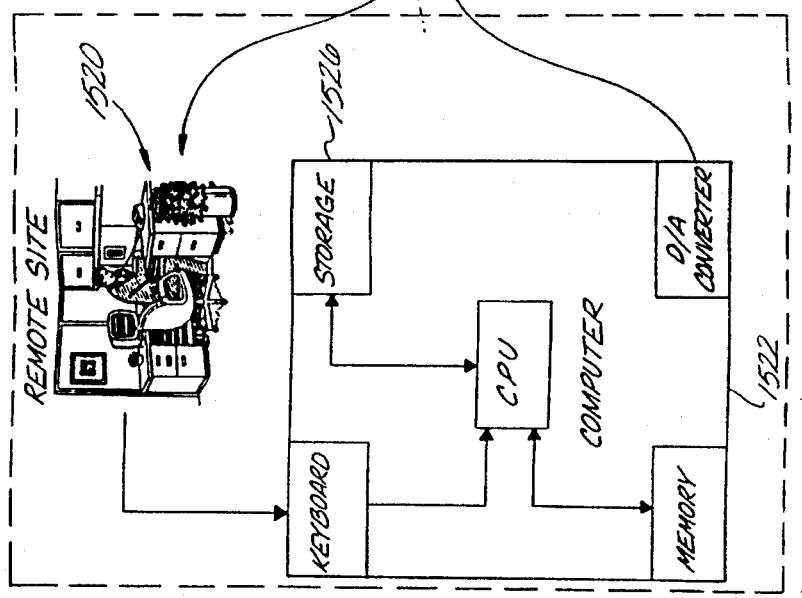
Fig. 7

Fig. 16

| | ASSIGNED VCR CHANNEL NUMBERS | LOCAL CHANNEL NUMBERS |
|---|---|---|
| BROADCAST CHANNELS | | |
| WBBM (CBS) | 2 | 2 |
| WMAQ (NBC) | 5 | 5 |
| WLS (ABC) | 7 | 7 |
| WGN | 9 | 9 |
| WTTW (PBS) | 11 | 16 |
| WPWR | 50 | 45 |
| WGBO | 66 | 48 |
| CABLE CHANNELS | | |
| A&E | 10 | 10 |
| AMC | 4 | 4 |
| BET | 25 | 8 |
| BRAV | 24 | 29 |
| CNCB | 36 | 36 |
| CNN | 13 | 35 |
| CSPAN | 27 | 30 |
| DIS | 23 | 25 |
| ESPN | 3 | 6 |

APPARATUS AND METHODS FOR PROVIDING INITIALIZING SETTINGS TO AN APPLIANCE

BACKGROUND OF THE INVENTION

1. Field of the Invention:

This invention relates to remote controllers and particularly to apparatus and methods for initializing settings on appliances.

2. Description of the Related Art:

There are many appliances for which initial setup is required, including VCRs, cable boxes, televisions, microwave ovens, timers for lights, timers for sprinkler systems, and heater/air conditioning control systems. Every time power is removed and then reapplied to these appliances, the appliance settings, such as the clock, must be initialized. For example, when a power outage occurs for an appliance such as a VCR the time setting for the clock in the VCR is lost and when power is reapplied to the VCR the clock setting displayed on the appliance is incorrect and needs to be reinitialized or set. When power is restored after a power outage, the clock displayed on the liquid crystal display (LCD) of many VCRs becomes a flashing "12:00" and keeps flashing until the user resets the clock. Resetting the clock typically requires many steps, even if a relatively convenient method is available, such as an "on screen" method for setting the clock. This is an annoyance to the user and often the user will put up with the flashing "12:00" rather than take the time to reset the clock. Other set up data in the VCR, such as a channel map from broadcast channels to cable channels, may also need setting when a power outage occurs. Appliances such as cable boxes, televisions, microwave ovens, timers for lights, and heater/air conditioning control systems also lose data when a power outage occurs. This is not an uncommon event and may happen 3 to 4 times a year in a typical household, which leads to a time consuming and annoying process of initializing settings on each appliance. Accordingly, there is a need in the art for a system for more conveniently initializing the settings of appliances such as VCRs, cable boxes, televisions, microwave ovens, timers for lights, timers for sprinkler systems, and heater/air conditioning control systems.

SUMMARY OF THE INVENTION

A principal object of the present invention is to provide methods and apparatus for setting a clock in an appliance. In one embodiment, the user initiates a telephone connection with a remote site, which downloads over the telephone connection a first sequence of commands for setting the clock in the appliance. The first sequence of commands are stored in a memory in the remote controller. Then to set the clock in the appliance, the user enters a single command into the remote controller, such as by pressing a clock or send button on the remote controller. The pressing of the button is processed in the remote controller and a time read from a second clock in the remote controller is inserted into the first sequence of commands for setting the clock in the appliance to form a sequence of time commands. Then the sequence of time commands are transmitted from the remote controller to the appliance to set the clock in the appliance.

Another principal object of the present invention is to provide methods and apparatus for setting a first clock in an appliance from a universal remote controller. In one embodiment, a universal remote controller has a second clock and a stored sequence of commands for setting the first clock in the appliance. A user enters a single command into the remote controller, such as by pressing a "clock or send" button. The single command is processed in the remote controller to insert a time read from the second clock in the remote controller into the sequence of commands for setting the first clock in the appliance to form a sequence of time commands. Then the remote controller transmits the sequence of time commands from the remote controller to the appliance to set the first clock in the appliance.

In another embodiment, a universal remote controller memorizes or learns the sequence of commands for setting the first clock in the appliance by storing the commands when they are manually entered into the remote controller by a user. Once the manually entered commands are stored in the remote controller, then by pressing a single button, such as a "clock or send" button on the remote controller, the clock in the appliance can be set. A time read from a second clock in the remote controller is inserted into the sequence of commands for setting the first clock in the appliance to form a sequence of time commands. Then the remote controller transmits the sequence of time commands from the remote controller to the appliance to set the first clock in the appliance.

In another embodiment, apparatus and methods are provided for initializing settings in an appliance. A user initiates a telephone connection with a remote site and the remote site downloads over the telephone connection a first sequence of commands for initializing settings in the appliance. The first sequence of commands are stored in a memory in the remote controller. The user enters a single command into the remote controller to initialize settings in the appliance. The single command is processed in the remote controller to read the first sequence of commands from the memory and transmit the sequence of commands from the remote controller to the appliance to initialize settings in the appliance.

Apparatus and methods are also provided for initializing settings in an appliance using a universal remote controller.

A method for testing the validity of a downloading procedure for initializing settings in an appliance is also provided. The test includes the steps of downloading from a remote site a clock setting to the remote controller and also downloading a sequence of commands for setting a clock in an appliance. Then the user enters a single command into the remote controller to set the first clock in the appliance to be equal to a second clock in the remote controller. Then the user informs the remote site as to the times set in the remote controller and the appliance.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 7 is a diagram of a system for downloading initial settings via telephone for providing initial setup to appliances according to the present invention.

FIG. 16 is an example of a cable to local channel mapping.

DETAILED DESCRIPTION

Figure 1:
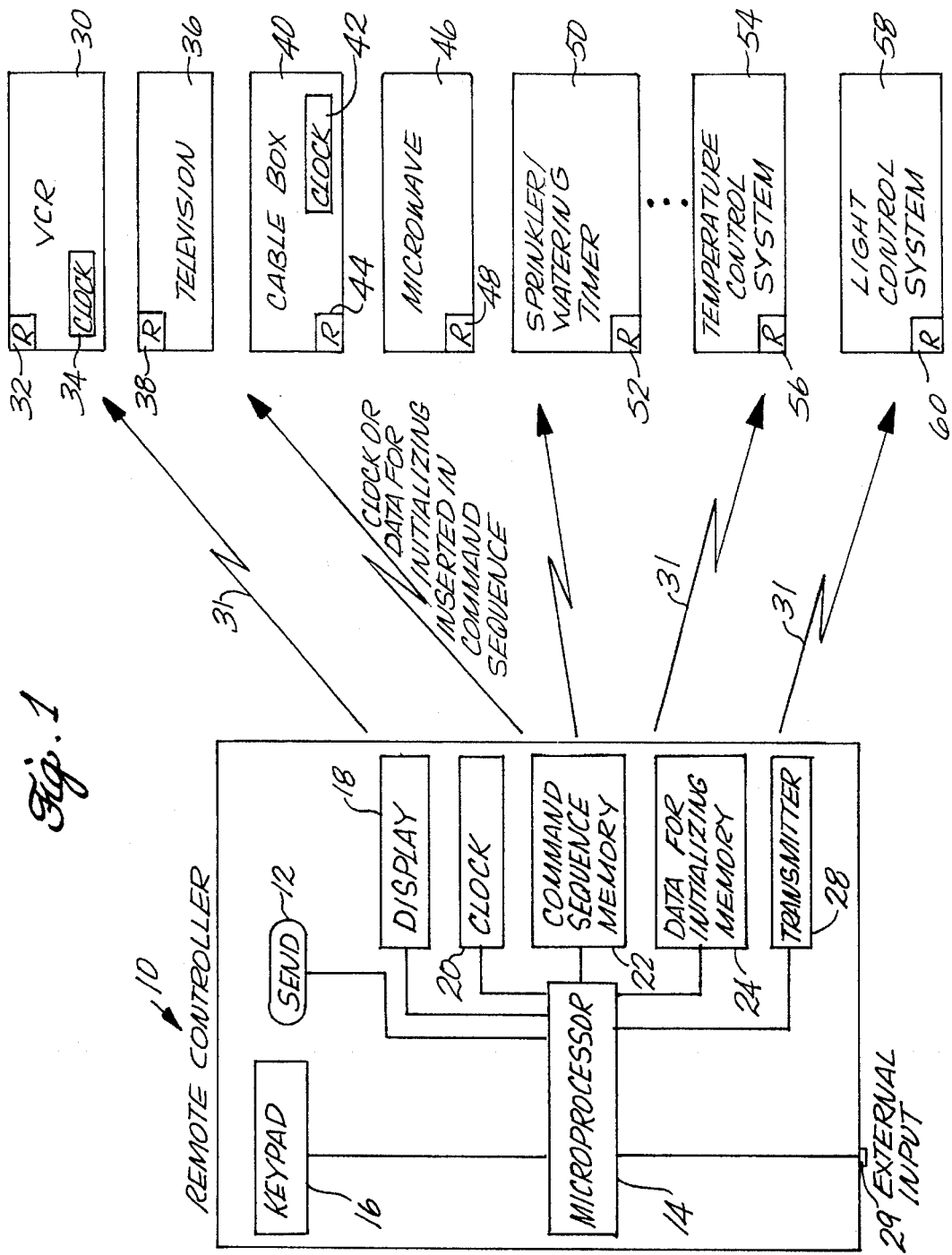
FIG. 1 is a drawing showing a system for providing initial settings to appliances according to the present invention.

Referring now to the drawings, and more particularly, to FIG. 1, there is shown a remote controller 10 for controlling various appliances. The remote controller 10 could be a universal remote controller capable of controlling all of the appliances shown in FIG. 1, or there could be a particular remote controller for each appliance. The appliances to be controlled by a remote controller include VCR 30, television 36, cable box 40, microwave 46, sprinkler-water timer 50, temperature-control system 54, and light-control system 58. These are example appliances that can be controlled by a remote controller and are certainly not all of the appliances that can be so controlled in accordance with this invention.

The remote controller 10 contains a microprocessor 14, a keypad 16, a display 18, a clock 20, a command-sequence memory 22, a data-for-initializing memory 24, and a transmitter 28. The remote controller also contains a send button 12. In addition to using the keypad 16 for entering information into the remote controller, the external input 29 can also be used to enter data into the remote controller 10. The elements in remote controller 10 are standard except for clock 20, the command-sequence memory 22 and the data-for-initializing memory 24. Also, many remote controllers do not have a display 18. Power for the remote controller 10 is provided by batteries (not shown).

The remote controller 10, in addition to providing the normal functions of a remote controller for a particular appliance, also has the capability for sending clock information to an appliance in order to initialize the clock in the appliance and also the capability for sending data-for-initializing to an appliance to initialize settings in the appliance. For example, to set clock 34 in VCR 30, the user of the remote controller 10 would push the send button 12. This would cause microprocessor 14 to access a command sequence to set the clock from the command-sequence memory 22. The microprocessor 14 would also access time from clock 20 and insert the time into the command sequence and then transmit the assembled time commands to the VCR 30 via transmitter 28 in the remote controller 10 and receiver 32 in the VCR 30.

Other functions may need initializing in the VCR. For example, in some VCRs, it is possible to assign each broadcast and/or cable channel to a VCR channel number. This capability allows a user to map broadcast channel numbers and cable channel numbers into the VCR. For example, FIG. 16 shows the mapping of local channel numbers into assigned VCR channel numbers. For example, broadcast channel WPWR which has a local channel number of 45 is mapped to an assigned VCR channel number of 50. It can be appreciated that a user must spend considerable time assigning local channel numbers to assign VCR channel numbers. When the power is removed from the VCR, the channel assignments stored in the VCR are lost and have to be reset when the power is reapplied to the VCR. In the present invention, the channel assignments can be stored in the data-for-initializing memory 24. A command sequence for sending the channel assignments to the VCR can be stored in command-sequence memory 22. When the user presses the send button 12 and a number code on keypad 16, which would indicate that this is the command for sending data-for-initializing to the VCR, the microprocessor 14 accesses the command sequence for sending the initializing data to the VCR from the command-sequence memory 22, and accesses the channel assignment map from the data-for-initializing memory 24, and then inserts the channel assignment map into the accessed command sequence and transmit the entire command-data sequence to the VCR 30 via remote controller transmitter 28 and receiver 32 in the VCR 30.

Many of the other appliances shown in FIG. 1 may have a clock that also needs resetting after power is lost by the appliance. For example, cable box 40 has a clock 42, and typically many of the other appliances would also have a clock, such as the microwave 46, the sprinkler-water timer 50, the temperature-control system 54, and the light-control system 58. All of those appliances use the time of day to control turning on or off a subsystem or controlling the operation of a subsystem.

Figure 2:
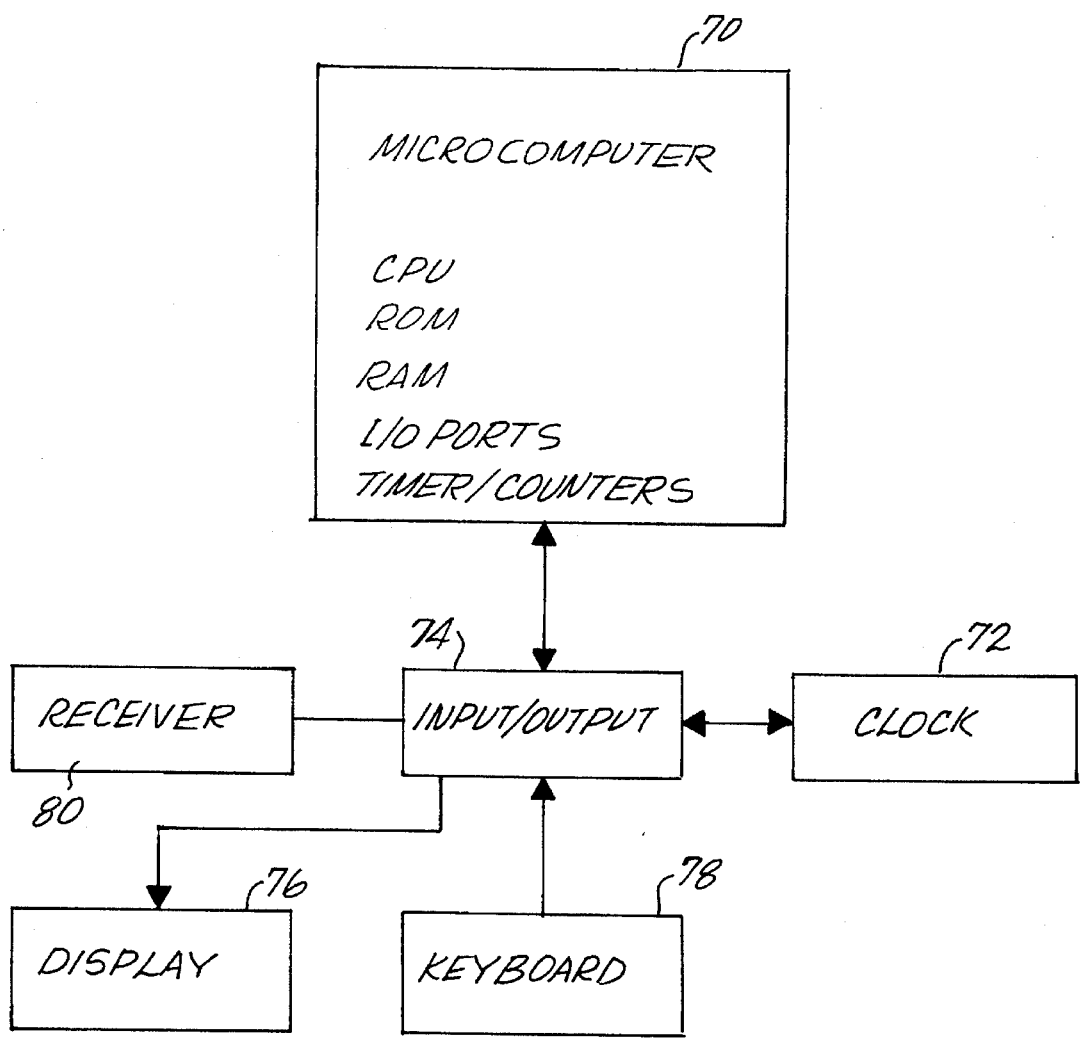
FIG. 2 is a schematic of a typical appliance.

FIG. 2 is a block diagram of a schematic of a typical appliance. As shown, a typical appliance includes a microcomputer 70, which contains a CPU, a ROM, a RAM, I/O ports, and timers and counters. The microcomputer 70 has an input/output port 74 which interfaces to a display 76, a keyboard 78 and a clock 72. In a typical appliance, the user uses the keyboard 78 to set the clock 72 and to set other settings in the appliance, such as timers and counters. The display is used to display the time of the clock and also to display various timers and other settings. The input/output also interfaces with a receiver 80 which can receive a transmission from a remote controller. The receiver 80 can be an infrared receiver, an R/F receiver or any other device that can receive commands from a remote controller.

In the example given above for the channel assignment map in the appliance, the channel assignment map can be stored in the RAM inside the microcomputer 70. When the time-command sequence discussed above is sent to the appliance, it is received by receiver 80 and then the microcomputer 70 extracts the time information in the command sequence and uses it to set clock 72. For appliances such as the sprinkler-water timer 50, the temperature-control system 54 and the light-control system 58, typical initializing settings that must be set up for the appliance to properly operate include the timers and the counters. For example, it is not unusual when power is lost that the settings for turning on and off sprinklers have to be reset in a sprinkler-water timer 50. If these settings are stored in the data-for-initializing memory 24, and the command sequences to send those settings to the sprinkler-water timer 50 are stored in command-sequence memory 22, then when the power is lost to the sprinkler-water timer 50, the user can use remote controller 10 to send the data-for-initializing to the sprinkler-water timer 50 to set up all of the timers and counters.

Figure 3:
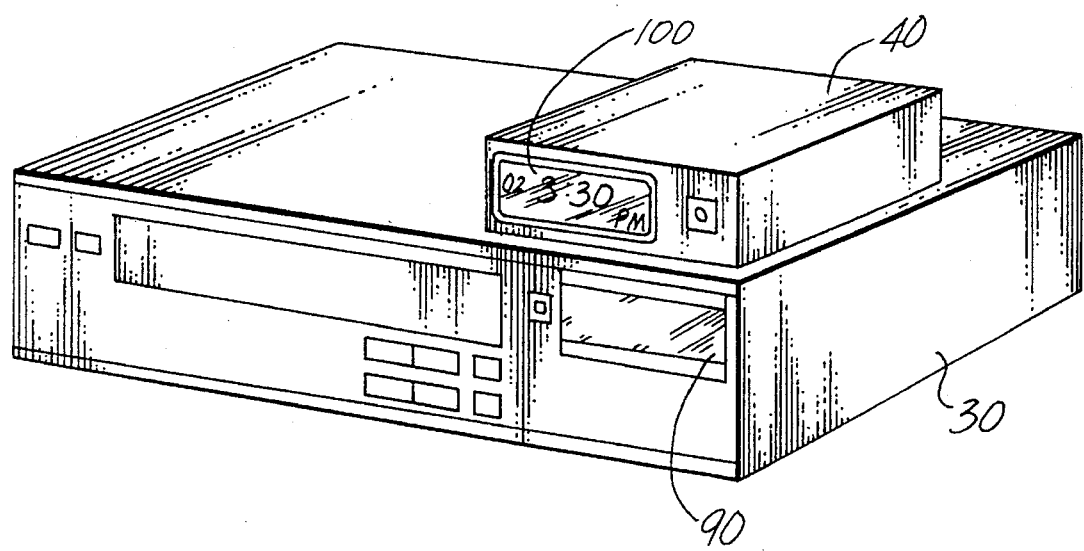
FIG. 3 is a perspective view showing a cable box placed on top of a VCR with both appliances having a display of a clock.

FIG. 3 is a perspective view showing a cable box placed on top of a VCR with both appliances showing a display of a clock. VCR 30 has a display 90 showing the time on a clock. As discussed above, when a typical VCR loses power, the display 90 becomes a flashing "12:00" o'clock. Similarly, cable box 40 shows a display 100 of a clock. When power is lost to these subsystems, the user must reset the clocks or allow the flashing "12:00" o'clock to continue. If the user does not reset the clock on the VCR 30, then the user will not be able to program the VCR to turn on and off at the right times for recording a program, using the internal clock of the VCR 30. When power is lost to the VCR 30 shown in FIG. 3, the remote controller 10, which is powered by batteries, does not lose power and so the clock in the remote controller is still set at the proper time. Thus, when the user presses the send button 12 on the remote controller 10 to send the time in clock 20 to the VCR 30 via the transmitter 28, the correct time is set into clock 34 of the VCR and the correct time will then be immediately displayed on display 90 of the VCR.

Figure 4:
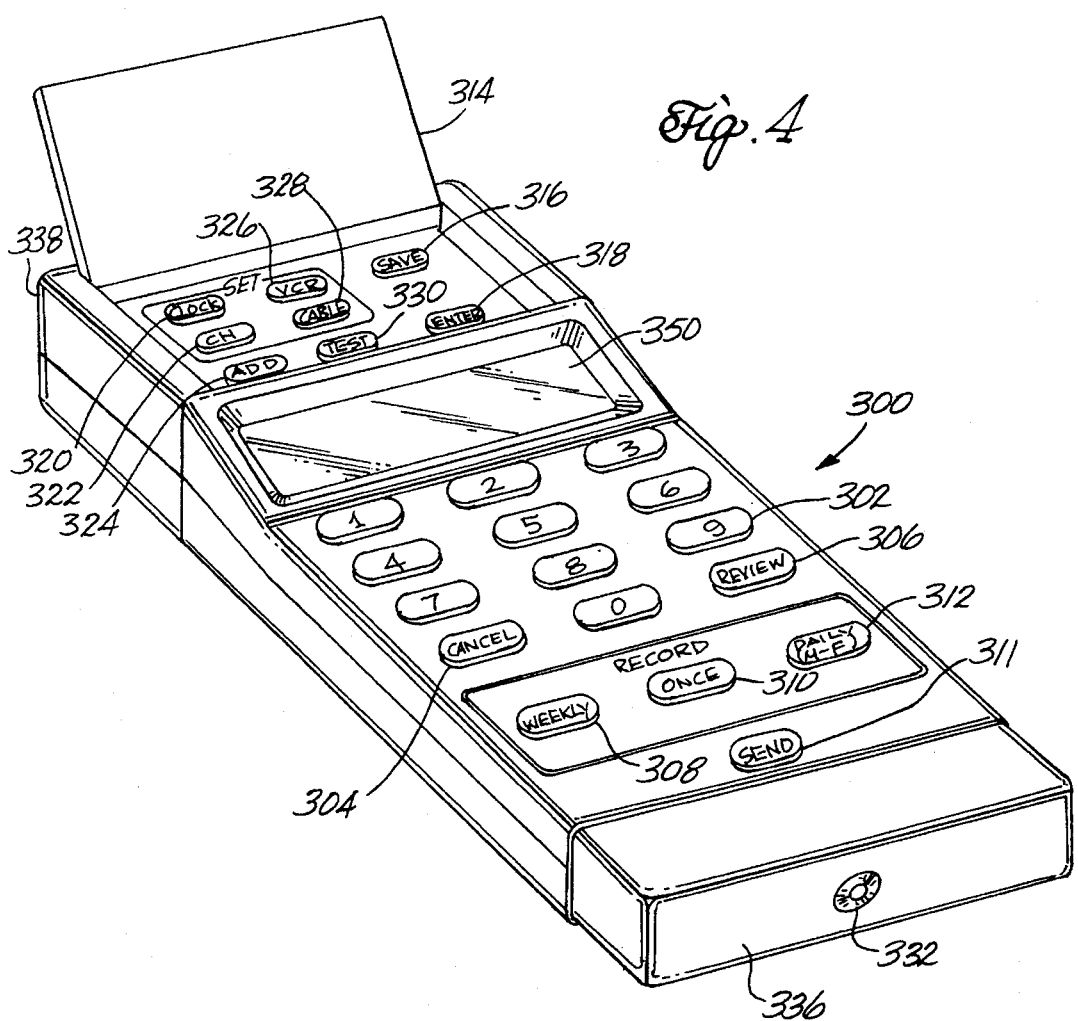
FIG. 4 is a perspective view of an apparatus for using compressed codes for recorder preprogramming and for providing initial settings to appliances according to the present invention.

Another embodiment of a remote controller for providing initializing settings to an appliance is the instant programmer 300, shown in FIG. 4. The instant programmer 300 uses compressed codes for recorder preprogramming, and is fully disclosed in patent application Ser. No. 08/031,246, which is incorporated herein by this reference, as though set forth in full. The instant programmer 300 has number keys 302, which are numbered 0 through 9, a CANCEL key 304, a REVIEW key 306, a WEEKLY key 308, a ONCE key 310 and a DAILY (M-F) key 312, which are used to program the instant programmer 300. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. Other features of instant programmer 300 shown on FIG. 4 are: liquid crystal display 350 and red warning light emitting diode 332. The functions of these keys are discussed in patent application Ser. No. 08/031,246. FIG. 4 also shows that the instant programmer 300 has a send button 311.

Figure 5:
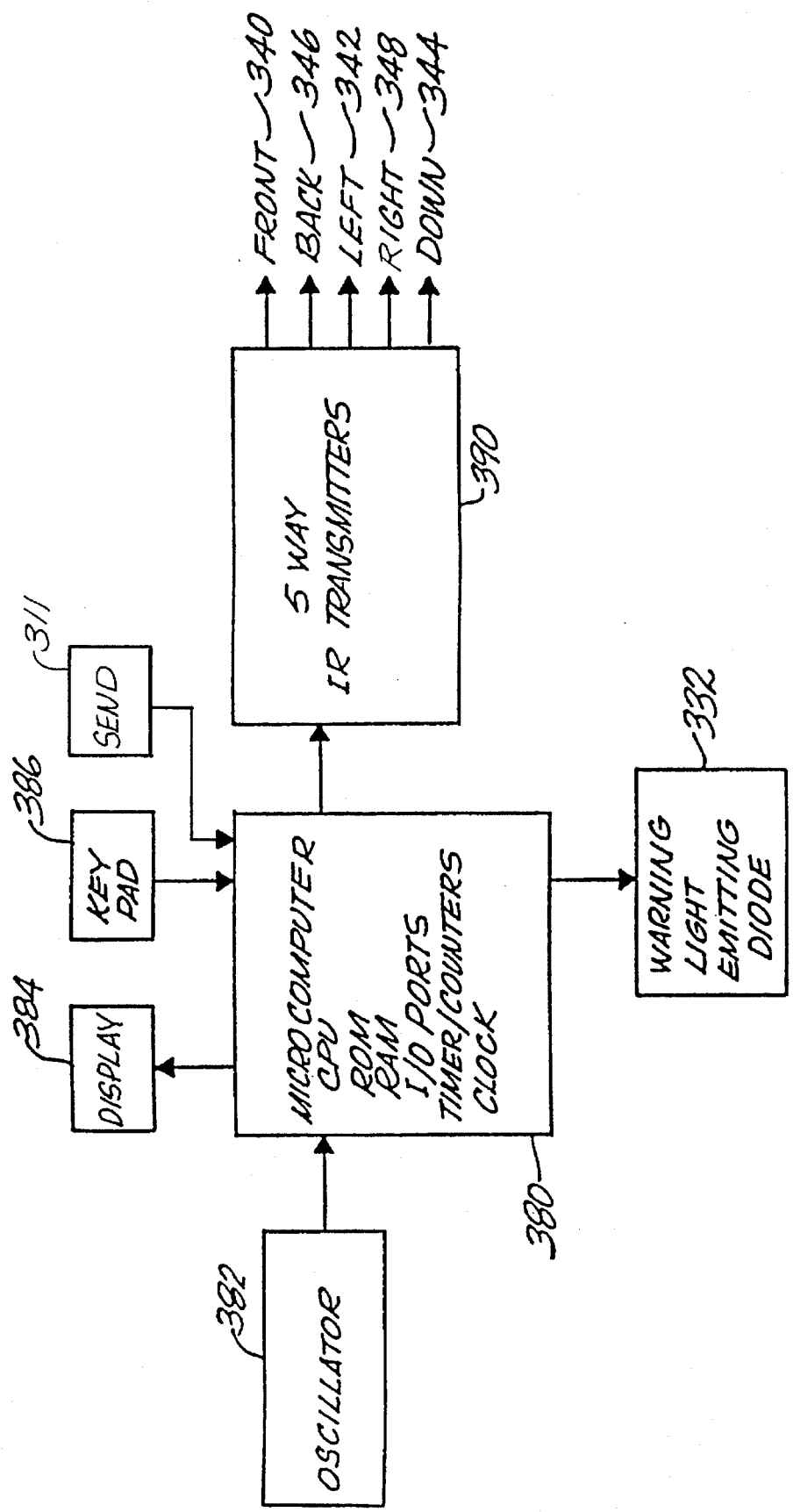
FIG. 5 is a schematic showing apparatus for using compressed codes for recorder preprogramming and for providing initial setup to appliances according to the present invention.

FIG. 5 is a schematic showing the components of the instant programmer 300. The schematic of instant programmer 300 is similar to the schematic in FIGS. 1 and 2 for remote controller 10. Display 384 corresponds to display 18, and keypad 386 corresponds to keypad 16. Send button 311 corresponds to send button 12. The clock 20, the microprocessor 14, the command-sequence memory 22 and the data-for-initializing memory 24 are combined in the microcomputer 380 of FIG. 5. An oscillator 382 supplies a frequency for the timers and the clock of microcomputer 380. The instant programmer 300 has a five-way IR transmitter 390 which is capable of transmitting to the front 340, to the back 346, to the left 342, to the right 348 and downward 344. The five-way transmitter enables the instant programmer to transmit to a VCR regardless of the position of the instant programmer in a room relative to a VCR. The instant programmer 300 is powered by batteries (not shown).

The operation of the instant programmer for sending time for a clock or data-for-initializing inserted in a command sequence to an appliance is the same as remote controller 10. The command sequences can be stored in the ROM or the RAM of microcomputer 380, and also the data-for-initializing can be stored in the ROM or the RAM of microcomputer 380. When the user presses send button 311 and a key on keypad 386 to designate the data-for-initializing to send, the microcomputer accesses the command sequence from the RAM or ROM and accesses the data-for-initializing from the RAM or ROM and sends the command-data sequence to the appliance via the five-way IR transmitter 390. If the clock has been selected for resetting, then the microcomputer accesses the clock, inserts it into the command sequence for sending the clock, and then transmits the time-command sequence via the five-way IR transmitter 390.

Figure 6:
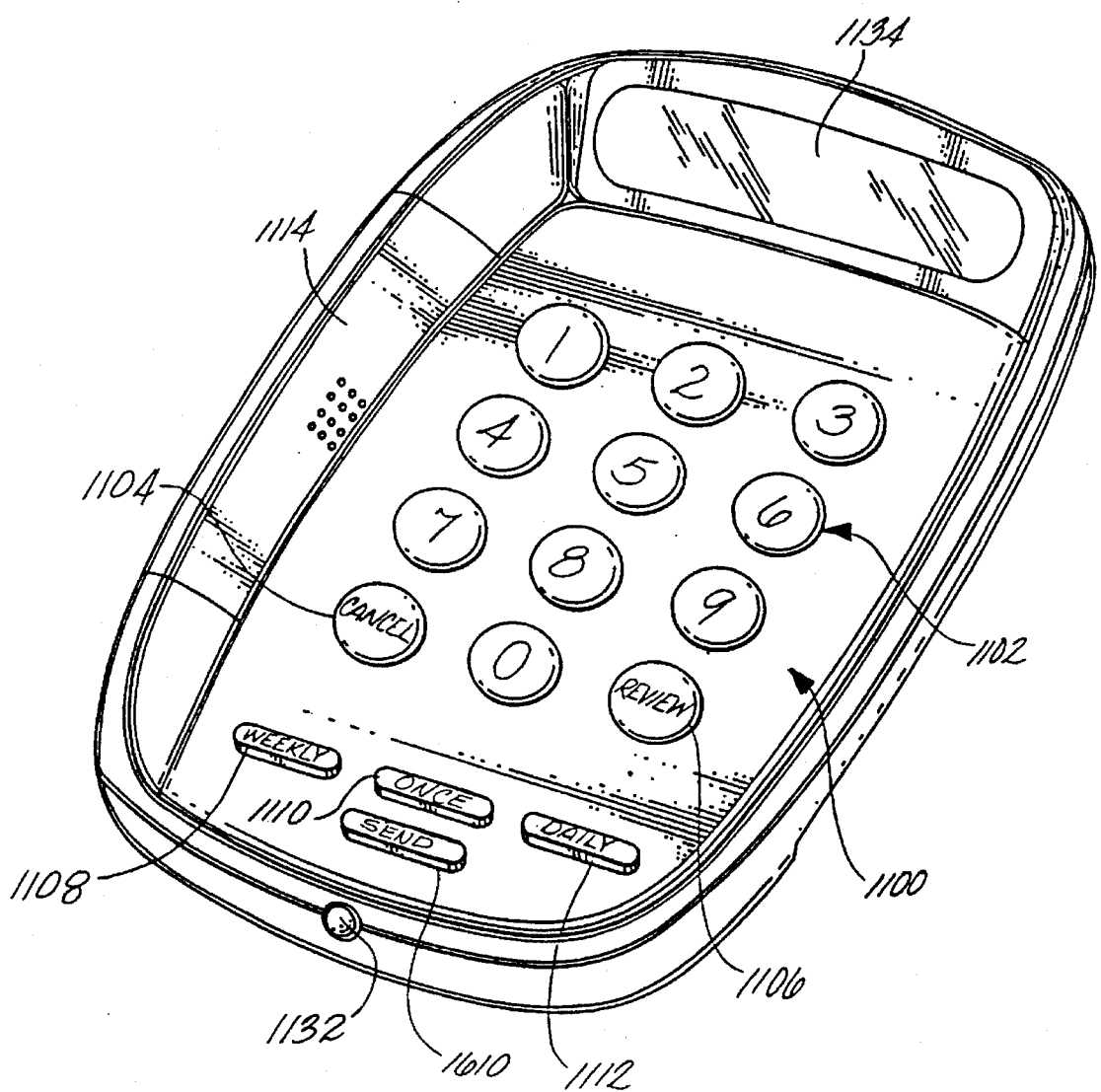
FIG. 6 is a perspective view of an apparatus for providing initial setup to appliances according to the present invention.
Figure 8:
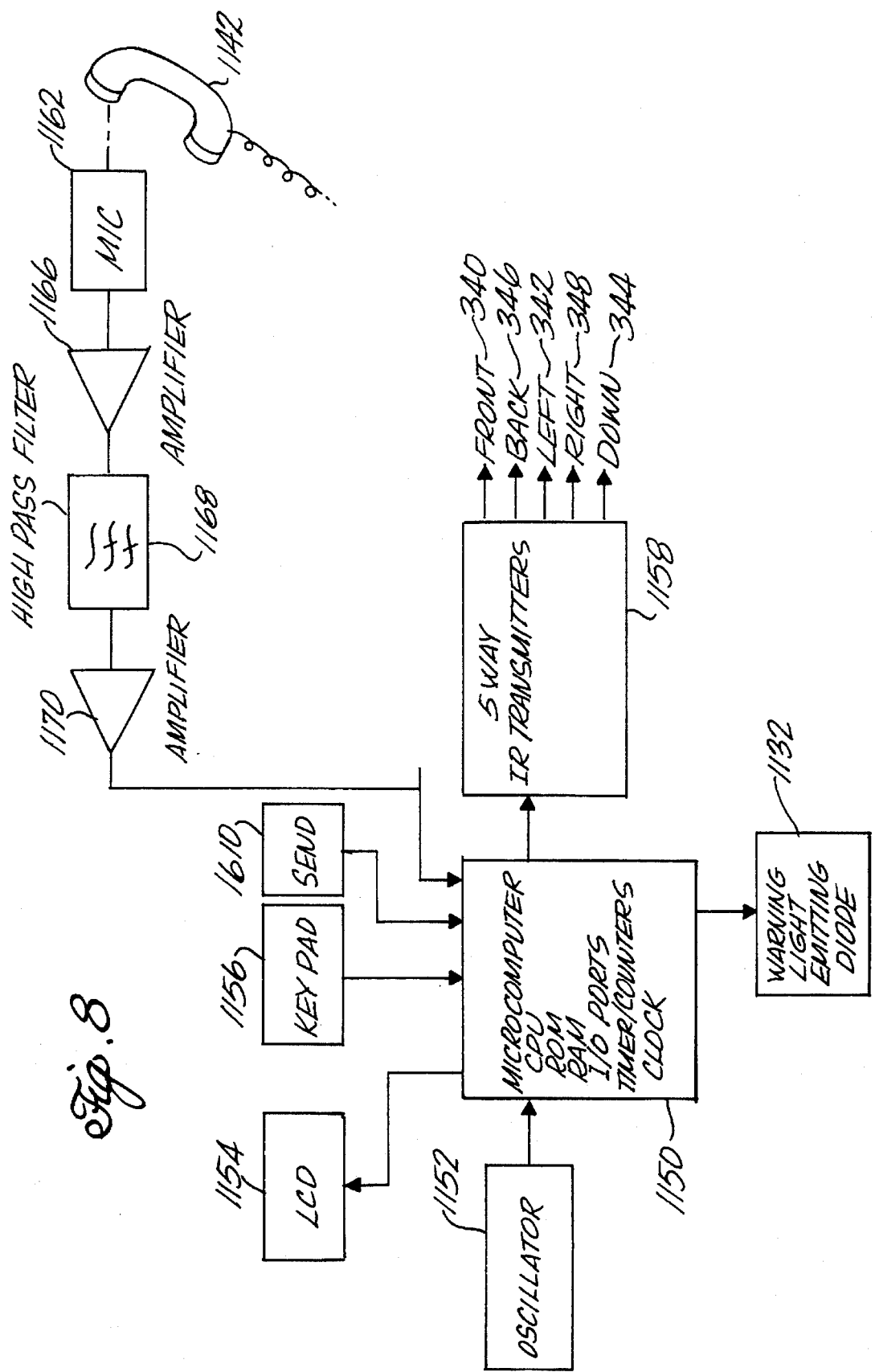
FIG. 8 is a schematic according to a preferred embodiment of the invention.

Another preferred embodiment of a remote controller for providing initializing settings to an appliance is the custom programmer 1100 of FIG. 6. The custom programmer 1100 uses compressed codes for recorder preprogramming, and is fully disclosed in patent application Ser. No. 08/031,246. The custom programmer 1100 is similar to instant programmer 300 and has number keys 1102, which are numbered 0–9, a CANCEL key 1104, a REVIEW key 1106, a WEEKLY key 1108, a ONCE key 1110 and a DAILY (M-F) key 1112, which correspond directly to keys 302–312 of instant programmer 300, and which are used to program the custom programmer 1100. Like the instant programmer 300, a lid normally covers other keys, which are used to setup the instant custom programmer 1100. When lid 1114 is lifted, the following keys are revealed, but not shown in the drawings: SAVE key, ENTER key, CLOCK key, CH key, ADD TIME key, VCR key, CABLE key, and TEST key. These keys of the custom programmer 1100 correspond to and operate substantially the same as keys 316–330 of instant programmer 300, respectively. Also included in the custom programmer 1100, as shown in the schematic of FIG. 8 are: liquid crystal display 1154, red warning light emitting diode 1132, keypad 1156, IR transmitters 1158, microcomputer 1150, and oscillator 1152. The custom programmer is powered by a battery (not shown).

The custom programmer also has a send button 1610 that corresponds to the send button 311 of instant programmer 300.

When using the custom programmer 1100 and the instant programmer 300, the consumer initially performs a set-up sequence, consisting of selecting a protocol for the model/brand of VCR, setting the current real time, selecting a protocol for the model/brand of cable box, and entering a series of channel number assignments. Although the instant programmer 300 makes recording of television programs extremely simple, the initial set-up sequence for the instant programmer 300 is somewhat complex and deters the use of the instant programmer by some consumers. Custom programmer 1100 includes a microphone opening 1140, shown in FIG. 7, through which a microphone inside the custom programmer 1100 can receive electronically coded audio signals that contain the information necessary for the custom programmer's initial set-up and commands to store this information into the custom programmer 1100. This same opening 1140 can be used to receive command sequences and data-for-initializing appliances.

In order to receive these audio signals, a user may call a special phone number which could be a toll-free 800 number, a pay-per-minute 900 number, or a standard telephone number with standard toll charges applying. The user can speak to an operator at a remote site 1520, and/or communicate with an automated system 1526. The operator or automated system orally inquires from the user the information regarding the user's appliances, such as the model and brand numbers. Other information can also be communicated such as the zip code of the user and the newspaper or other publication which the user will use to obtain compressed codes for VCR programming. This is all the information needed to perform the initial set-up for the custom programmer 1100. From the zip code information, the operator can determine to which cable system the user is connected and can combine this data with the knowledge of which publication the user will use to select the correct local channel mapping table.

The operator then directs the user to press a designated programming key which is, in the case of the preferred embodiment, the CH key located under lid 1114. When the CH key is pressed, the display 1134 will display the message "PHONE1 KEY2". Pressing the "2" numeric key places the custom programmer into the manual local channel table programming mode that is implemented by custom programmer 1100 by depressing the CH key. Pressing the "1" numeric key initiates the remote programming mode. The custom programmer 1100 is then ready to receive an audio signal and display 1134 displays the message "WAIT".

The operator will then direct the user to place the earpiece 1142 of the telephone receiver 1144 over the microphone opening 1140 of the custom programmer 1100 as generally shown in FIG. 7. The earpiece need not be placed directly against the custom programmer 1100, but may be held more than an inch away from the microphone opening with generally satisfactory results. After a pause sufficient to allow the user to place the telephone receiver in the proper position, the operator and/or automated system will initiate the downloading of the initial set-up data and initial set-up programming commands and transmit the data over the telephone line 1146 to the user's custom programmer 1100. The operator or automated system will also initiate the downloading of the command sequences and data-for-initializing appliances and transmit these over the telephone line 1146 to the user's custom programmer 1100.

If the initial set-up data is successfully transferred to the custom programmer 1100, the display 1134 of the custom programmer 1100 will display the message "DONE". If the reception of the initial set-up data is not successful within a predetermined time limit, warning light emitting diode 1132 will blink to inform the user to adjust the position of the telephone earpiece before another down load of the information is attempted. After a waiting period allowing this adjustment, the initial set-up data and commands are re-transmitted over the telephone line. If after a predetermined number of attempts to download the initial set-up information are unsuccessful, the liquid crystal display 1134 displays the message "FAIL" and the operator is again connected to the user allowing the operator to speak to the user to provide additional assistance in the positioning of the telephone earpiece.

FIG. 8 is a schematic of the circuitry needed to implement the custom programmer 1100. In FIG. 8, earpiece 1142 generates serial audio signals which are received by microphone 1162. The audio signals received by microphone 1162 are passed through amplifier 1166, through a high pass filter 1168 with a passband of approximately 1–4 kHz, and through a second amplifier 1170 to the microcomputer 1150.

When the command sequences and the data-for-initializing with respect to a specific appliance are sent over the telephone lines and received by microphone 1162, they are stored in the RAM of microcomputer 1150. The advantage of having the command sequences and the data-for-initializing loaded via the telephone is that the storage required in the microcomputer 1150 is reduced. If all of the command sequences and data-for-initializing for all of the appliances had to be stored in the microcomputer 1150, the storage would be enormous. The custom programmer allows the user to describe to the operator or the automated system the appliances the user wishes to control via the remote controller. The operator or the automated system can access the command sequences and data-for-initializing for those particular appliances and download only those command sequences and data-for-initializing to the remote controller. Once the command sequences and data-for-initializing are stored in the RAM of microcomputer 1150, the operation of the custom programmer for setting a clock in an appliance or for initializing settings in an appliance are the same as described for the remote controller 10 shown in FIG. 1 or for the instant programmer 300 shown in FIGS. 4 and 5.

Figure 9:
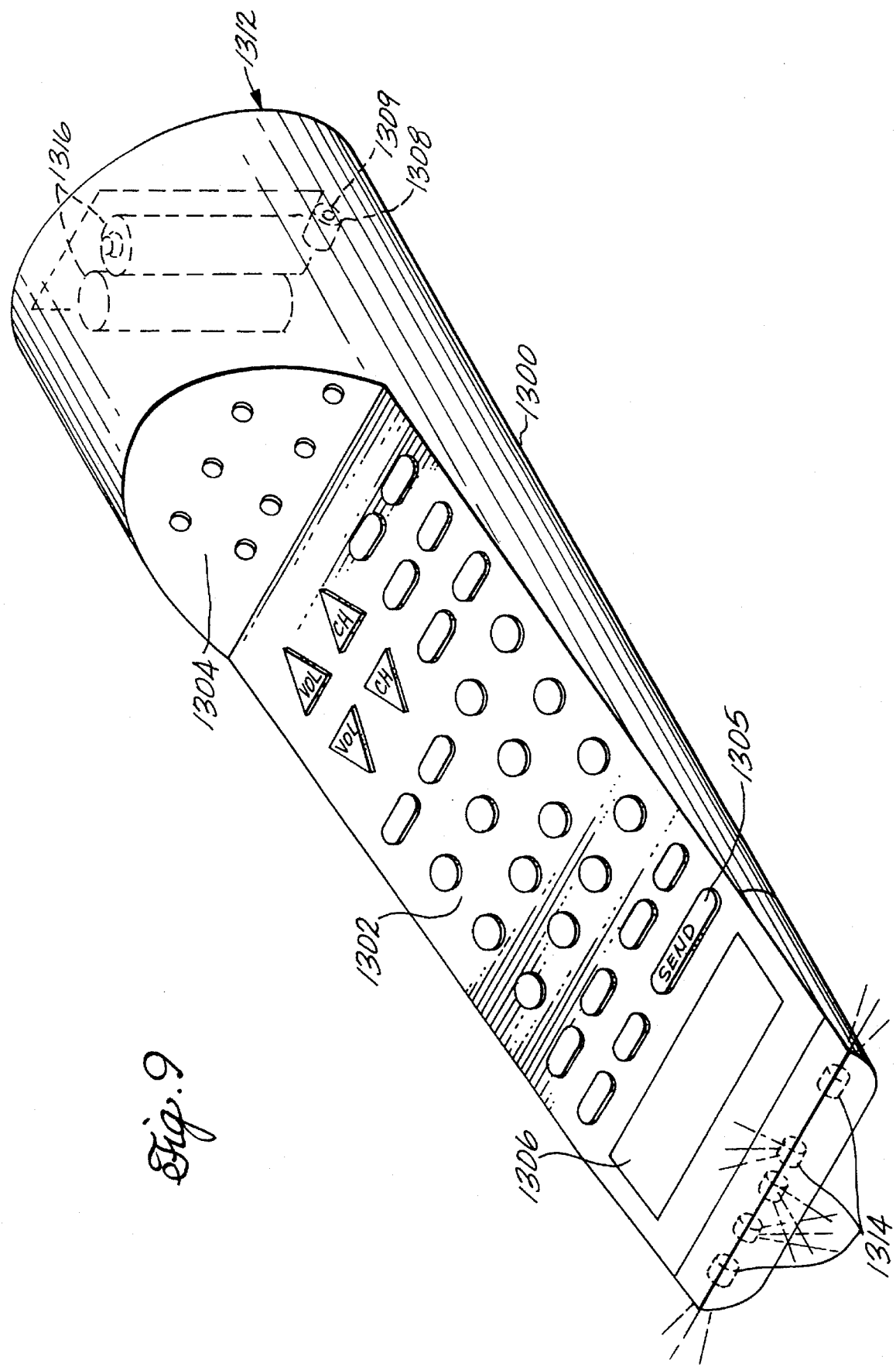
FIG. 9 is a perspective view of a universal remote control for providing initial setup to appliances according to a preferred embodiment of the invention.

Another embodiment of a remote controller for providing initializing settings to an appliance is the custom controller 1300 shown in FIG. 9. The custom controller contains the same circuitry and performs the same functions as the custom programmer 1100, but also performs the functions of a complete universal remote control that can be setup automatically. The custom controller includes on its main control surface 1302 and its auxiliary control surface 1304, buttons that perform the same functions as the buttons of the custom programmer 1100, including send button 1305, that corresponds to send button 1610 on the custom programmer 1100. A display 1306 is included that performs the same functions as display 1134 and IR transmitters 1314 which perform the same functions as IR transmitters 1158 of programmer 1100. The custom controller can also be equipped with a lid (not shown) that covers hidden keys (not shown) used to setup the custom controller like lid 314 and keys 316–330 on the instant programmer 300. The keys under the lid could include SAVE, ENTER, CLOCK, CH, ADD TIME, VCR, CABLE and TEST keys like the instant programmer and the custom programmer. The custom controller 1300 is powered by batteries 1316.

The custom controller includes a microphone 1308, which performs the same functions as microphone 1162 of the custom programmer 1100 and is accessible through the microphone access hole 1309. Through the microphone, the custom controller is programmed with all of the set-up information needed to function as an instant or custom programmer (i.e., channel map, current time of day, model/brand of cable box and VCR). Also command sequences and data-for-initializing appliances can be sent through the microphone and loaded into a memory (not shown) in the custom controller.

Custom controller 1300 also includes additional buttons on its control surfaces 1302 and 1304 that can be used to operate any home electronic device that can be controlled by an infrared remote control. These standard infrared remote controls work by transmitting different IR codes for each different function to be performed by the device being controlled. Each button of the custom controller triggers the transmission of an IR code that would ordinarily be transmitted by another remote control. The actual make up of these IR codes used to control the various home electronic equipment are described in more detail in U.S. Pat. No. 4,623,887 to Welles, II which is hereby incorporated by reference.

Before the custom controller can be used as a complete universal remote control, it must be programmed with the IR codes for the functions and the brand and models of home electronic equipment it is going to control. This can be done via codes downloaded via the microphone 1308 or by more traditional methods. First, the custom controller can "learn" the IR codes for the products that it is to control from the remote controls that come with each product. The custom controller would then also include an IR receiver (not shown) that would receive IR codes from other remote controls and store these codes, and which button on the custom controller each code is associated with, into RAM. The second traditional programming method involves providing a ROM that contains the IR codes for most functions of most brands and models of home electronic equipment. The user then enters into the custom controller what brand/model of each type of home electronic device that the user plans to use the custom controller with. In this method, for each brand and model of home electronic equipment, the custom controller will also include in ROM the associations between the IR codes for the equipment and the keys on the custom controller that will trigger the sending of the IR codes.

In an alternate embodiment, the custom controller can be programmed by either or both of these methods. IR codes that are "learned" from other remote controllers are stored in memory (not shown). Alternatively, a ROM (not shown) includes IR codes for most appliances, including VCRs, cable boxes, satellite receivers, televisions and stereo components.

The custom controller can also store or learn the command sequences and the data-for-initializing appliances.

Figure 10:
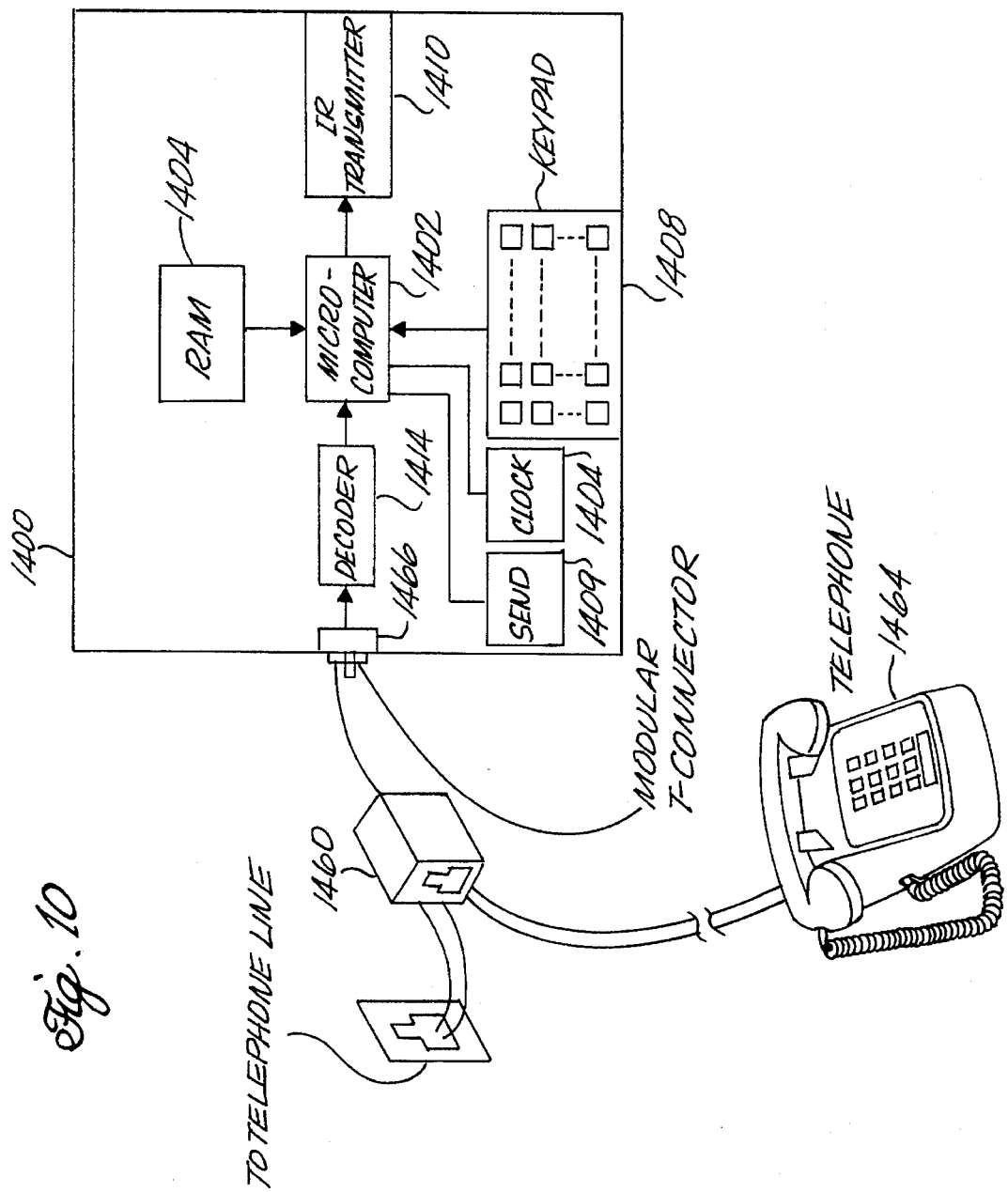
FIG. 10 is a diagram of an alternate system for downloading initial settings via telephone to a remote controller for providing initial setup to appliances according to the present invention.

Another embodiment for connecting a remote controller to telephone for providing initializing settings to an appliance is shown in FIG. 10. A modular jack 1466 is installed into the VCR remote controller 1400. In this embodiment, the VCR remote is connected to the telephone by a T-connector 1460. The downloading of command sequences and data-for-initializing to the remote controller 1400 is similar to the downloading of data to the custom programmer 1100, except there is a direct coupling by wire rather then acoustically. The command sequences and data-for-initializing are generated by a computer at a remote site and transmitted over telephone lines 1480, received by the VCR remote modular phone jack 1466, decoded in decoder 1414, and stored into RAM 1404 by CPU 1402.

The operation of the remote controller 1400 to send data-for-initializing to appliances is the same as the custom programmer 1100 and custom controller 1300. A send button 1409 on the remote controller 1400 operates in the same manner as send button 1305 on the custom controller 1300.

Now that various embodiments of remote controllers for providing initializing settings to appliances have been described, the following will detail the methods used with such remote controllers.

Figure 11A:
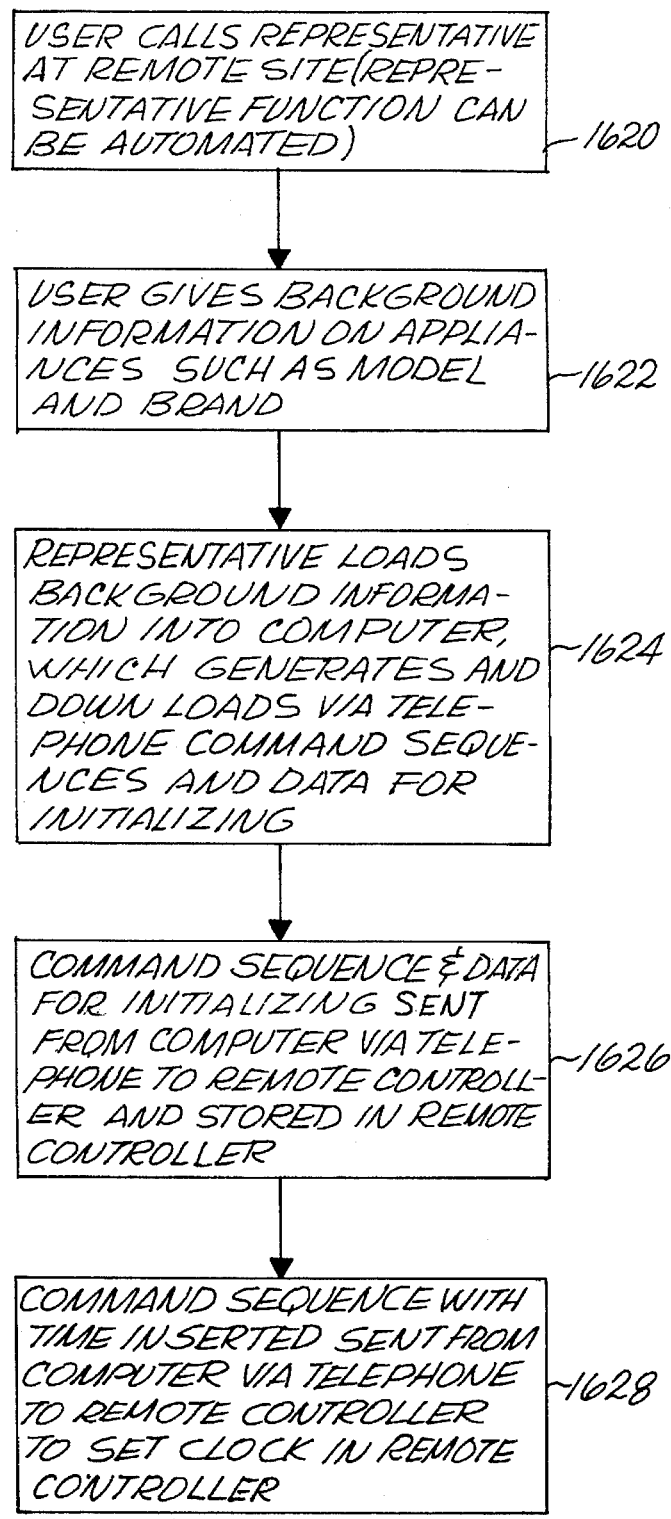
FIG. 11a is a flow diagram for downloading initial settings via telephone for providing initial setup to appliances according to the present invention.

FIG. 11*a* is a flow diagram for downloading initial settings via telephone for providing initial setup to appliances. In step 1620, a user calls a representative at a remote site. The function of the representative can be automated. In step 1622, the user gives background information on the appliances, such as the model and brand numbers of the appliances. In step 1624, the representative loads the background information into a computer which generates and downloads via telephone the command sequences and data-for-initializing appliances. In step 1626, the command sequences and data-for-initializing are sent from the computer via telephone to the remote controller and stored in memory in the remote controller. In step 1628, a command sequence with time inserted is sent from the computer via telephone to the remote controller to set the clock in the remote controller. The flow diagram of FIG. 11*a* can be used with the custom programmer 1100 shown in FIG. 6, the custom controller 1300 shown in FIG. 9, and also the remote controller 1400 shown in FIG. 10. All of these remote controllers have a method of downloading information into the remote controller via telephone.

Figure 11B:
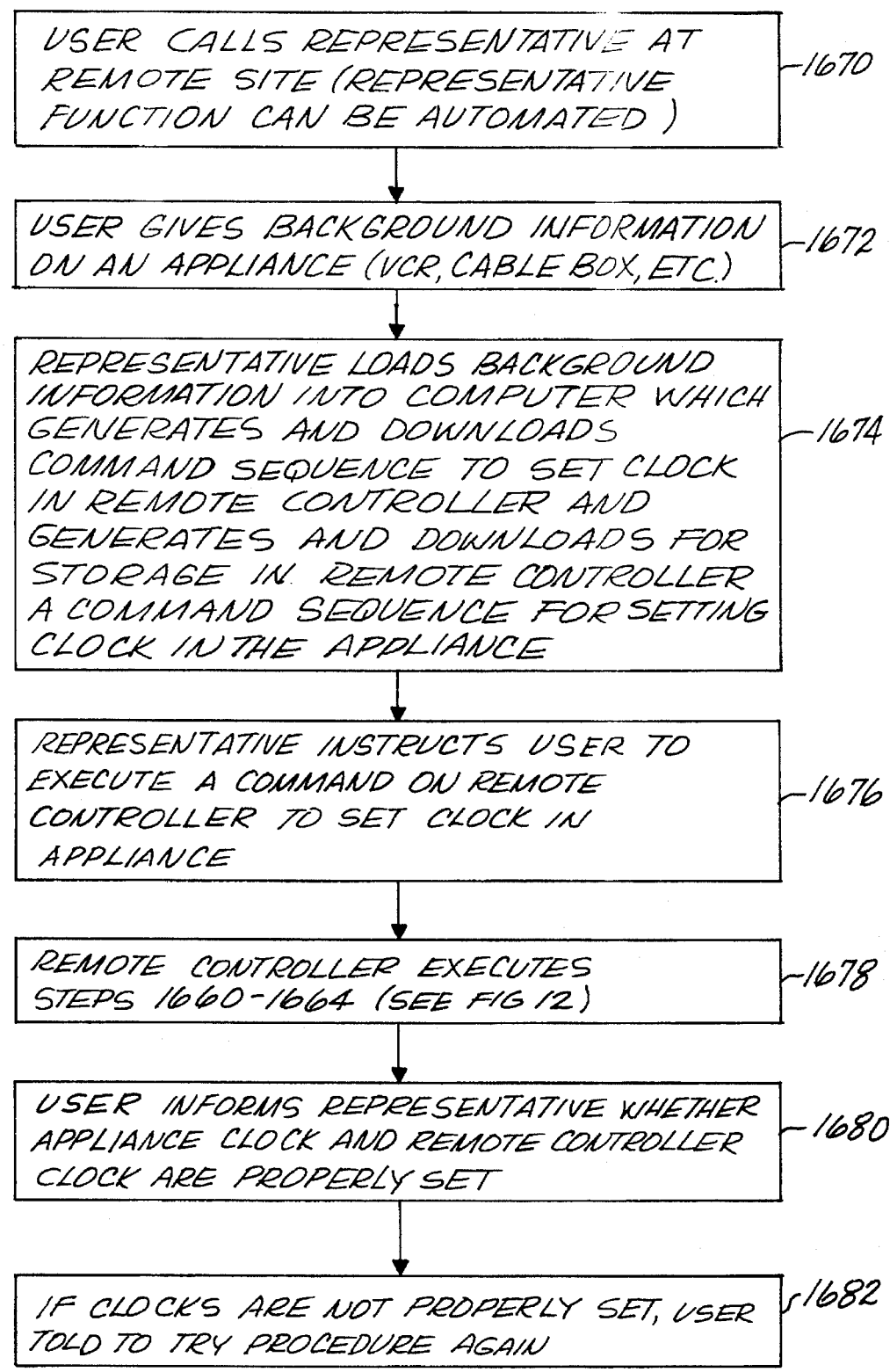
FIG. 11b is a flow diagram for testing and validating the downloading of initial settings via telephone to appliances according to the present invention.

FIG. 11*b* is a flow diagram for testing and validating the downloading of initial settings via telephone to appliances. In step 1670, the user calls a representative at a remote site. As discussed before, the representative function can be automated. In step 1672, the user gives background information on an appliance, such as a VCR. Then in step 1674, the representative loads the background information into a computer which generates and downloads a command sequence to set the clock in the remote controller. The computer also generates and downloads for storage into the remote controller a command sequence for setting the clock in the appliance. Then in step 1676, the representative instructs the user to execute a command on the remote controller to set the clock in the appliance.

Figure 12:
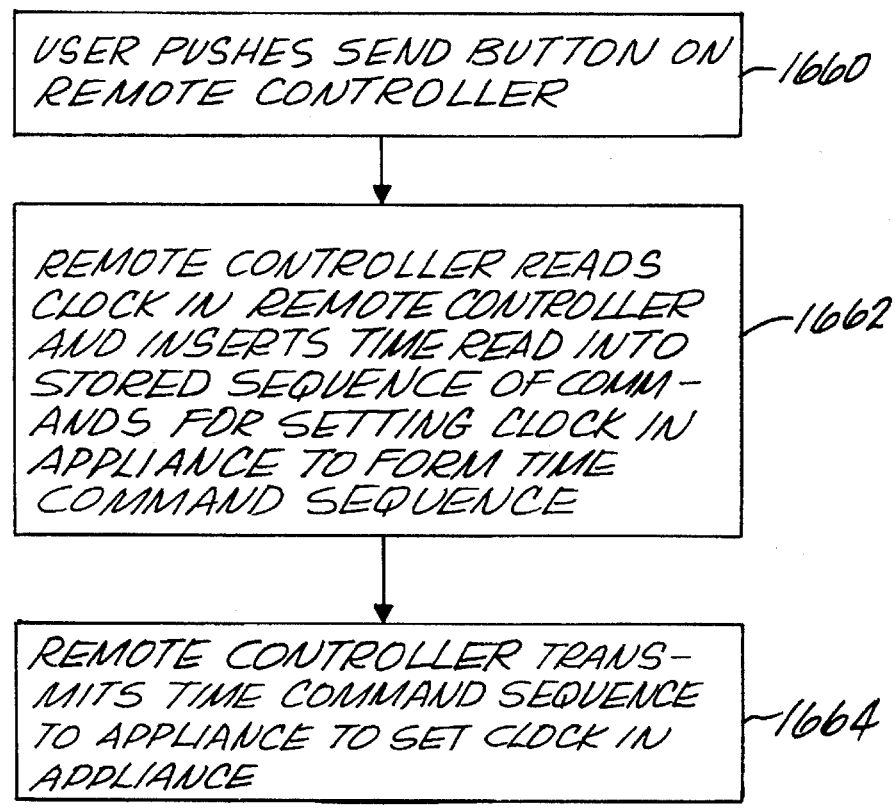
FIG. 12 is a flow diagram for sending initial setup for a clock to appliances according to the present invention.

To set the clock in the appliance, the steps of the flow diagram of FIG. 12 are executed. In step 1660, the user pushes the send button on the remote controller. Then in step 1662, the remote controller reads the clock in the remote controller and inserts the time read into the stored sequence of commands for setting the clock in the appliance to form a time-command sequence. In step 1664, the remote controller transmits the time-command sequence to the appliance to set the clock in the appliance.

After the steps of FIG. 12 are executed, then the user in step 1680 of FIG. 11*b* informs the representative whether the appliance clock and the remote controller clock are properly set. At this point in the procedure, the appliance clock and the remote controller clock should have the same settings. Finally, if the clocks are not properly set, then the user is told to try the procedure again in step 1682. The representative may, for example, inform the user to hold the telephone earpiece closer to the microphone on the custom controller.

Once the command sequences and data-for-initializing appliances have been downloaded to the remote controller, the user can initialize the settings of the appliance by operating the remote controller to send the initializing settings. For example, if the user wishes to reset the clock in the appliances, the steps in FIG. 12 are executed.

Figure 13:
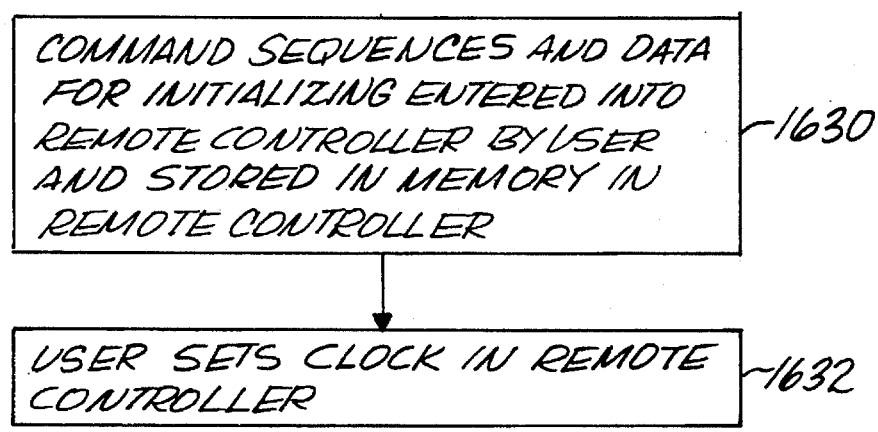
FIG. 13 is a flow diagram for manually setting up a remote controller for providing initial setup to appliances according to the present invention.

In some remote controllers, it is not possible to download the command sequences and the data-for-initializing via telephone. In these remote controllers, the command sequences and the data-for-initializing are already built in and stored in a memory in the remote controller or the user must enter these command sequences and data-for-initializing into the remote controller. The user must also set the clock in the remote controller. FIG. 13 is a flow diagram for manually setting up a remote controller. In step 1630, command sequences and data-for-initializing are entered into the remote controller by a user and stored in memory in the remote controller. In step 1632, the user sets the clock in the remote controller.

Figure 14:
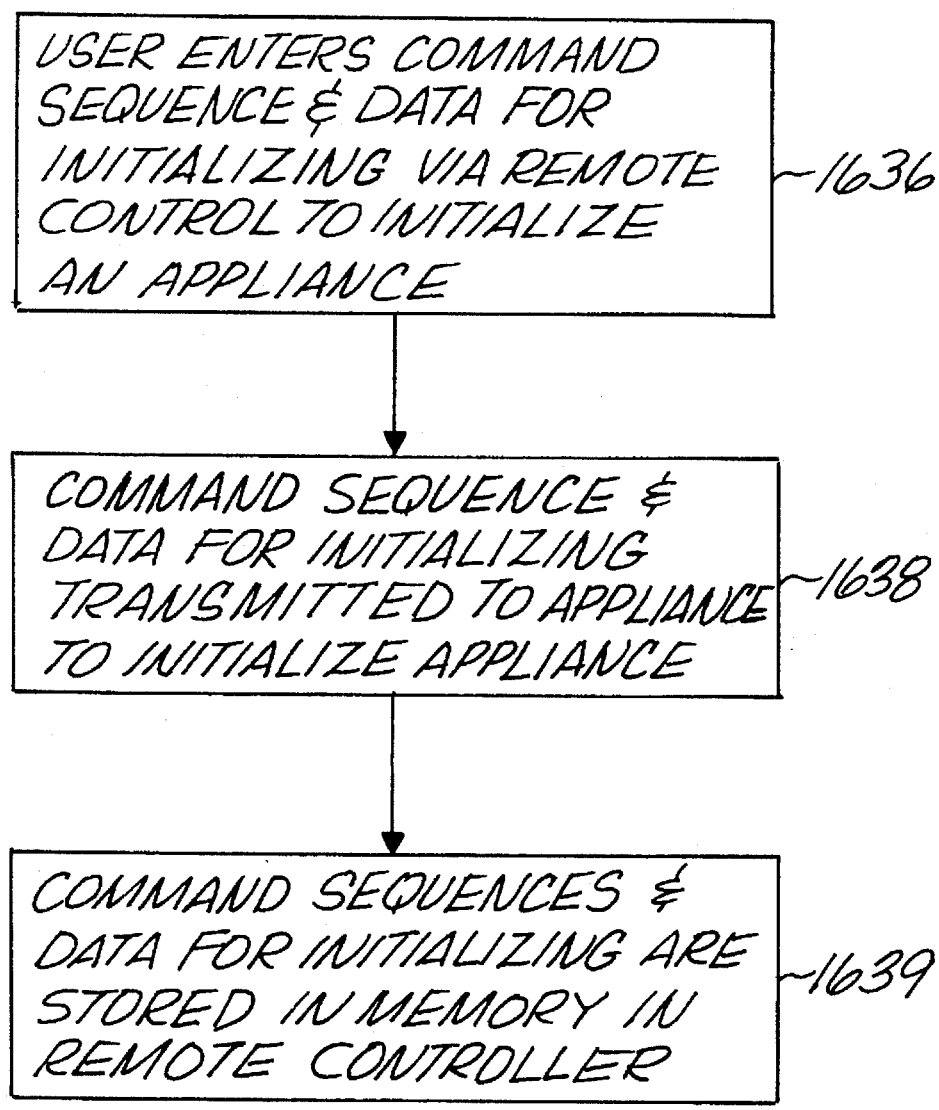
FIG. 14 is a flow diagram for memorizing and learning the initial setup for an appliance for providing initial setup to appliances according to the present invention.

In some remote controllers, it is possible to memorize a command sequence and memorize data-for-initializing appliances. The advantage of memorizing command sequences and data-for-initializing is that the remote controller need only store the command sequences and data-for-initializing that the user wishes the remote controller to memorize. For example, the user may wish the remote controller to memorize the command sequences for one model and brand of appliance but not others. FIG. 14 is a flow diagram for memorizing and learning the initial setup for an appliance. In step 1636, the user enters a command sequence and data-for-initializing an appliance via a remote controller. The remote controller sends the command sequence and data-for-initializing to the appliance and initializes the appliance in step 1638. In step 1639, the command sequences and data-for-initializing are stored in memory in the remote controller.

Figure 15:
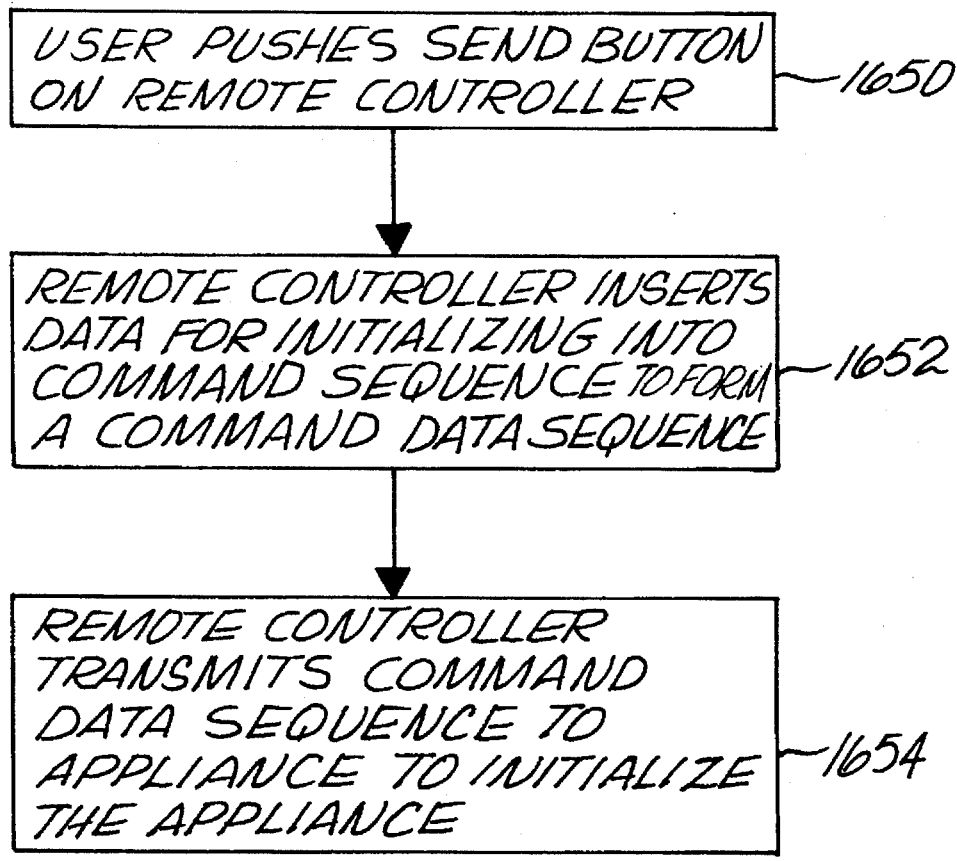
FIG. 15 is a flow diagram for sending initial setup to appliances according to the present invention.

Once the command sequences and data-for-initializing have been loaded or stored in the remote controller, the user can operate the remote controller to initialize an appliance. For example, if a power outage occurs, the user can operate the remote controller to reinitialize the clock and the channel mapping in a VCR. FIG. 15 is a flow diagram for sending initial setup to appliances. In step 1650, the user pushes the send button on the remote controller. Then in step 1652, the remote controller inserts the data-for-initializing read from memory into the command sequence read from the memory in the remote controller to form a command-data sequence. Then in step 1654, the remote controller transmits the command-data sequence to the appliance to initialize the appliance.

Thus, there has been described apparatus and methods for initializing settings in an appliance.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed:

1. A method for setting a first clock in an appliance at a remote site comprising the steps of:

initiating a telephone connection with a remote site;

communicating background information on the appliance to the remote site;

converting the background information describing the appliance into a first sequence of commands for setting the first clock in the appliance;

downloading over the telephone connection the first sequence of commands for setting the first clock in the appliance;

storing the first sequence of commands in a memory in a remote controller;

activating a single command on the remote controller;

processing the single command in the remote controller to insert a time read from a second clock in the remote controller into the first sequence of commands for setting the first clock in the appliance to form a sequence of time commands; and transmitting the sequence of time commands from the remote controller to the appliance to set the first clock in the appliance.

2. A system for setting a first clock in an appliance having a remote controller with a second clock, the system comprising:

means for communicating background information on the appliance to a remote site;

means for converting the background information describing the appliance into a first sequence of commands for setting the first clock in the appliance;

means for downloading over a telephone connection the first sequence of commands for setting the first clock in the appliance;

means for storing the first sequence of commands in a memory in the remote controller;

means for actuating a single command on the remote controller;

means for processing the single command in the remote controller to insert a time read from the second clock in the remote controller into the first sequence of commands for setting the first clock in the appliance to form a sequence of time commands; and means for transmitting the sequence of time commands from the remote controller to the appliance to set the first clock in the appliance.

3. A method for initializing settings in an appliance comprising the steps of:

initiating a telephone connection with a remote site;

communicating background information on the appliance to the remote site;

converting the background information into a first sequence of commands;

downloading over the telephone connection the first sequence of commands for initializing settings in the appliance;

storing the first sequence of commands in a memory in the remote controller;

downloading over the telephone connection data-for-initializing;

storing the data-for-initializing in the memory in the remote controller;

activating a single command on the remote controller;

processing the single command in the remote controller to read the first sequence of commands from the memory and to read the data-for-initializing from the memory;

inserting the data-for-initializing into the first sequence of commands to form a command-data sequence, upon the single command; and transmitting the command-data sequence from the remote controller to the appliance to initialize settings in the appliance, upon the single command.

4. A system for initializing settings in an appliance comprising:

means for initiating a telephone connection with a remote site;

means for communicating background information on the appliance to the remote site;

means for converting the background information into a first sequence of commands;

means for downloading over the telephone connection the first sequence of commands for initializing settings in the appliance;

means for storing the first sequence of commands in a memory in the remote controller;

means for downloading over the telephone connection data-for-initializing;

means for storing the data-for-initializing in the memory in the remote controller;

means for activating a single command on the remote controller;

means for processing the single command in the remote controller to read the first sequence of commands from the memory and to read the data-for-initializing from the memory;

means for inserting the data-for-initializing into the first sequence of commands to form a command-data sequence, upon the activation of the single command; and means for transmitting the command-data sequence from the remote controller to the appliance to initialize settings in the appliance, upon the activation of the single command.

5. A method for testing the validity of a downloading procedure for initializing settings in an appliance comprising the steps of:

initiating a telephone connection with a remote site;

downloading over the telephone connection to a remote controller for the appliance, a first sequence of commands for setting a first clock in the appliance;

downloading over the telephone connection to the remote controller for the appliance, a second sequence of commands to set a second clock in the remote controller;

storing the first sequence of commands in a memory in the remote controller;

actuating a single command on the remote controller;

processing the single command in the remote controller to insert a time read from the second clock in the remote controller into the first sequence of commands for setting the first clock in the appliance to form a sequence of time commands;

transmitting the sequence of time commands from the remote controller to the appliance to set the first clock in the appliance; and communicating the times set on the first clock and the second clock to the remote site over the telephone connection.

6. A system for testing the validity of a downloading procedure for initializing settings in an appliance comprising:

means for initiating a telephone connection with a remote site;

means for downloading over the telephone connection to a remote controller for the appliance, a first sequence of commands for setting a first clock in the appliance;

means for downloading over the telephone connection to a remote controller for the appliance, a second sequence of commands to set a second clock in the remote controller;

means for storing the first sequence of commands in a memory in the remote controller;

means for actuating a single command on the remote controller;

means for processing the single command in the remote controller to insert a time read from the second clock in the remote controller into the first sequence of commands for setting the first clock in the appliance to form a sequence of time commands;

means for transmitting the sequence of time commands from the remote controller to the appliance to set the first clock in the appliance; and means for communicating the times set on the first clock and the second clock to the remote site over the telephone connection.

7. A remote controller for initializing settings in an appliance, the remote controller comprising:

means for initiating a telephone connection with a remote site;

means for communicating background information on the appliance to the remote site;

means for converting the background information into a first sequence of commands;

means for downloading over the telephone connection the first sequence of commands for initializing settings in the appliance;

means for storing the first sequence of commands in a memory in the remote controller;

means for downloading over the telephone connection data-for-initializing;

means for storing the data-for-initializing in a memory in the remote controller;

means for activating a single command on the remote controller;

means for processing the single command in the remote controller to read the first sequence of commands from the memory and to read the data-for-initializing from the memory;

means for inserting the data-for-initializing into the first sequence of commands to form a command-data sequence, upon the activation of the single command; and means for transmitting the command-data sequence from the remote controller to the appliance to initialize settings in the appliance, upon the activation of the single command.

8. A method for setting a first clock in an appliance at a remote site comprising the steps of:

communicating background information on the appliance to the remote site;

converting the background information describing the appliance into a first sequence of commands for setting the first clock in the appliance;

transmitting the first sequence of commands for setting the first clock in the appliance to a remote controller;

storing the first sequence of commands in a memory in the remote controller;

activating a single command on the remote controller;

processing the single command in the remote controller to insert a time read from a second clock in the remote controller into the first sequence of commands for setting the first clock in the appliance to form a sequence of time commands; and transmitting the sequence of time commands from the remote controller to the appliance to set the first clock in the appliance.

* * * * *